United States Patent [19]

Ort

[11] 4,307,371
[45] Dec. 22, 1981

[54] METHOD AND APPARATUS FOR COVERING A FOIL STRAIN GAUGE

[75] Inventor: Werner Ort, Darmstadt, Fed. Rep. of Germany

[73] Assignee: Hottinger Baldwin Measurements, Inc., Framingham, Mass.

[21] Appl. No.: 42,909

[22] Filed: May 29, 1979

[30] Foreign Application Priority Data

Jun. 27, 1977 [DE] Fed. Rep. of Germany ....... 2728916

[51] Int. Cl.³ ............................................. G01L 1/22
[52] U.S. Cl. .................................... 338/2; 29/610 SG
[58] Field of Search ........................... 338/2, 3, 4, 5, ; 29/610 SG; 73/720, 721, 726, 727; 427/101-103, 123, 124

[56] References Cited

U.S. PATENT DOCUMENTS

| | | | |
|---|---|---|---|
| 3,395,564 | 8/1968 | Rastrelli et al. | 338/2 X |
| 3,475,712 | 10/1969 | Brown | 338/2 |
| 3,638,160 | 1/1972 | Huddleston | 338/2 |
| 3,639,875 | 2/1972 | Brower | 338/2 |
| 3,863,192 | 1/1975 | Grey | 338/2 |
| 3,986,254 | 10/1976 | Nordstrom | 338/2 |

*Primary Examiner*—C. L. Albritton
*Attorney, Agent, or Firm*—W. G. Fasse; D. F. Gould

[57] ABSTRACT

A foil strain gauge pick-up is protected against environmental adverse influences by a multi-layer covering hermetically sealing and enclosing substantially the entire pick-up including its terminals. The covering includes at least two layers, preferably three layers. The first layer adjacent to the foil strain gauge proper is an electrically insulating layer. The outer layer may be a vapor deposited metal or oxide layer. An intermediate layer may be electrically conducting.

15 Claims, 3 Drawing Figures

METHOD AND APPARATUS FOR COVERING A FOIL STRAIN GAUGE

BACKGROUND OF THE INVENTION

The invention relates to a method for covering a foil strain gauge arranged on a foil strain gauge pick-up and to a foil strain gauge pick-up having a foil strain gauge with terminals and with a covering for performing the method.

The foil strain gauges are generally embedded in organic materials which exchange water vapor with the surrounding atmosphere. If such a foil strain gauge is connected with a pick-up, the measured signal is influenced by the exchange due to a swelling or shrinking of the support. Such influence necessarily has a negative effect on the constancy of the zero point of the measured signal being provided by the pick-up. In order to remove this disadvantage prior foil strain gauge pick-ups are, for example hermetically encapsulated by means of folding bellows. Such encapsulations cause difficulties with regard to the stiffness of the hermetic enclosure. Besides, they are elaborate and very expensive.

OBJECTS OF THE INVENTION

Based on this prior art it is the object of the invention to suggest a method which provides an encapsulation against moisture of a foil strain gauge arranged on a pick-up, whereby the encapsulation shall not influence the measured signal.

SUMMARY OF THE INVENTION

The invention achieves this objective in that a multi-layer hermetic water-proof covering is applied which encloses the foil strain gauge, its terminals, and at least a portion of any remaining free surface of the foil strain gauge pick-up. Due to this hermetic connection of the covering directly with the foil strain gauge pick-up a moisture exchange between the support of the foil strain gauge and the surrounding atmosphere cannot take place.

For performing this method a foil strain gauge pick-up is suggested comprising a foil strain gauge with terminals and with a covering of the foil strain gauge which is characterized in that the multiple layer covering comprises an electrical insulating buffer layer and a moisture-proof vapor deposited layer on top of the buffer layer.

By coating the foil strain gauge with an electrically insulating layer which is preferably an epoxy resin layer, a buffer layer is applied which does not impair the stretching of the foil strain gauge. By the subsequent vapor deposition of a mositure-proof layer which may be a metal layer, for example, of aluminum or gold, it is achieved that this vapor deposited layer is tightly bonded to the pick-up and that on the other hand by the selection of the thickness of the vapor deposited layer the latter remains completely tight against moisture influences.

In another embodiment of the invention the moisture-proof layer may be an oxide layer. Especially where an epoxy resin is used as a buffer layer it is achieved that between the pick-up and the foil strain gauge arranged thereon a interface layer is formed which has a small sloping angle, which hugs the foil strain gauge very well, whereby a surface is formed which is free of pores and abrupt transitions. If now the moisture-proof vapor deposited layer is applied to said buffer layer, no shadow formation may occur during the vapor depositing. Otherwise, the moisture-tight, hermetic encapsulation would be interrupted by such shadow formation.

The method according to the invention may also be performed with a foil strain gauge pick-up having a foil strain gauge with terminals and a covering of the foil strain gauge which is distinguished by the fact that the multiple layer covering comprises an electrically insulating buffer layer, an electrically conducting intermediate layer arranged on the buffer layer, and a moisture-proof cover layer galvanically applied to the intermediate layer and covering the latter. Foil strain gauge pick-ups encapsulated hermetically against moisture in this manner are particularly suitable for use under rough operating conditions due to said encapsulation.

A further embodiment of the invention is seen in that the buffer layer is an epoxy resin, that the conducting intermediate layer is an epoxy resin comprising a metal powder as a filler material and with a cover layer of galvanical nickle.

BRIEF FIGURE DESCRIPTION

Preferred embodiments of the invention will now be described by way of example with reference to the following accompanying drawings.

DETAILED DESCRIPTION OF PREFERRED EXAMPLE EMBODIMENTS AND OF THE BEST MODE OF THE INVENTION

Figure 1:
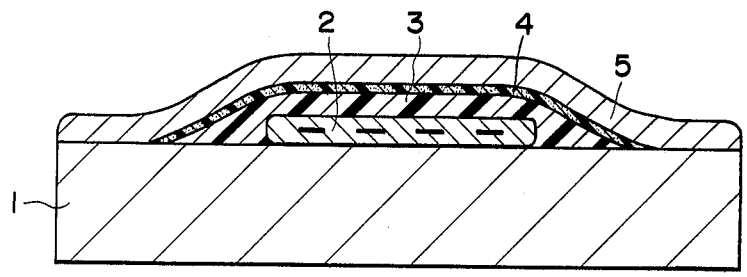
FIG. 1 shows a foil strain gauge secured to a pick-up and provided with a covering according to the invention.
Figure 2:
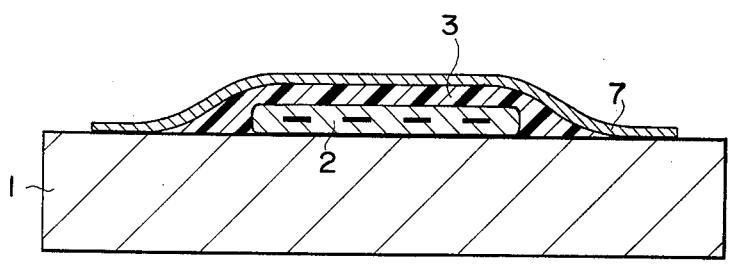
FIG. 2 shows another embodiment of a foil strain gauge to be covered on a pick-up.

According to FIG. 1, a foil strain gauge 2 embedded in an organic material is secured to a pick-up 1 for measuring forces effective on the pick-up 1. A buffer layer 3 of epoxy resin covers the foil strain gauge 2 as well as a portion of the pick-up 1 all around the foil strain gauge 2. Instead of using an epoxy resin, it is possible to preferably use also a polymethane or phenolic resin. An electrically conducting intermediate layer 4 is applied to the buffer layer according to FIG. 1, whereby the strain gauge is completely covered over. The electrically conducting intermediate layer 4 is made of the mentioned resin to which a metal powder has been admixed as a filler material. After the application of this layer it is now possible to perform a galvanizing operation due to the electrical conductivity whereby a moisture-proof galvanized layer 5 is produced. Preferred materials for the galvanized layer 5 are nickle and chromium, that is, especially such metals which form a very smooth layer free of pores and particularly those which keep exhibiting a very good corrosion resistance even under moisture conditions.

FIG. 1 illustrates an example embodiment in which a foil strain gauge 2 embedded in an organic material is applied to the pick-up 1. The foil strain gauge 2 is coated with a buffer layer 3 in the manner as described with reference to FIG. 1. Now a thin layer is vapor deposited. By means of such vapor deposition a very tight metal or oxide covering is achieved which prevents the entrance of moisture all around the strain gauge. Due to the inclusion of the pick-up in the vapor deposition a completely heremetic encapsulation is achieved. Materials that may be used for the vapor deposited layer 7 are aluminum, gold, silver, chromium, nickle, as well as inorganic oxides such as $SiO_2$ or cryolite, or silicone monoxide (SiO) or vaporizable glass.

Figure 3:
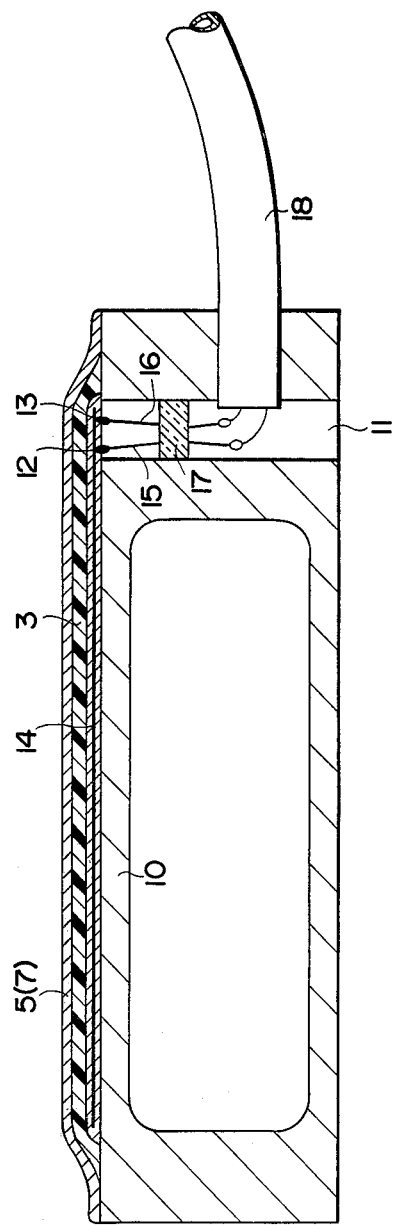
FIG. 3 shows an especially advantageous connection of the foil strain gauge terminal with an outgoing cable.

An especially preferred embodiment of the invention relative to the moisture-proof contacting of the foil strain gauge pick-up by means of an outgoing cable is described in more detail with reference to FIG. 3. A contact to the hermetically encapsulated foil strain gauge pick-up 10 is preferably made by means of pins 15 and 16 through a bore 11 above which there are located terminals 12 and 13 of a foil strain gauge 14. The pins are connected with a cable 18 leading out from the foil strain gauge pick-up by means of a glass feed-through 17. Such arrangement makes it possible that the foil strain gauge pick-up may be provided on its surface on which a foil strain gauge 14 is arranged, with a hermetically sealing layer 5 or 7 without any abrupt transitions which otherwise could cause a shadowing effect especially during the vapor deposition which could lead to a moisture leak. By leading the terminals through pins downwardly and enclosing the opening 11 through a glass lead-through 17, it is assured, even in this embodiment, that no moisture may reach through the buffer layer to the foil strain gauge. Thus, it has been achieved that with regard to the change of the zero point of the foil strain gauge pick-up a pick-up has been provided which is constant relative to moisture.

Although the invention has been described with reference to specific example embodiments, it will be appreciated, that it is intended to cover all modifications and equivalents within the scope of the appended claims.

I claim:

1. A method of protecting a foil strain gauge pick-up against environmental influences, comprising the steps of preparing a substrate, boring a hole in said substrate, applying foil strain gauge means including terminals to said substrate, receiving the terminals in said bore hole, applying a waterproof, hermetically sealing multiple layer covering to the foil strain gauge pick-up in such a manner that the foil strain gauge proper, said terminals of the foil strain gauge, and at least a portion of any remaining free surface of said foil strain gauge pick-up substrate on which the foil strain gauge is arranged, are enclosed by said multiple layer covering, said step of applying a waterproof hermetically sealing multiple layer comprising coating the foil strain gauge means and at least a portion of any remaining free surface of the substrate with an electrically insulating buffer layer, and depositing a further moisture-proof vapor barrier layer thereover, said method further comprising sealing a moisture barrier insulating feed-through in the substrate bore hole having electrical leads therethrough for electrical coupling to the terminals of the foil strain gauge means thereby providing a vapor barrier electrical coupling.

2. A foil strain gauge pick-up comprising, substrate means, foil strain gauge means including electrical terminal means operatively secured to said substrate and multiple layer covering means enclosing said foil strain gauge pick-up, said covering means comprising an electrically insulating buffer layer and a moisture-tight oxide layer applied to the buffer layer by vapor deposition.

3. A foil strain gauge pick-up comprising, substrate means, foil strain gauge means including electrical terminal means operatively secured to said substrate, and multiple layer covering means enclosing said foil strain gauge pick-up, said covering means comprising an inner electrically insulating buffer layer and a galvanically deposited moisture-tight outer cover layer.

4. The foil strain gauge pick-up of claim 3, wherein said multiple layer cover means comprises an electrically conducting intermediate layer.

5. The foil strain gauge pick-up of claim 4, wherein said intermediate layer comprises a resin material with metal powder embedded in said resin material.

6. The foil strain gauge pick-up of claim 3, wherein said galvanically deposited outer moisture-tight layer comprises a metal having good corrosion resistance which forms a smooth layer free of pores.

7. The foil strain gauge pick-up of claim 6, wherein said galvanically deposited outer moisture-tight layer comprises a metal selected from the group consisting of nickel and chromium.

8. A foil strain gauge pick-up comprising, substrate means, foil strain gauge means including electrical terminal means operatively secured to said substrate and multiple layer covering means enclosing said foil strain gauge pick-up, said covering means comprising an electrically insulating buffer layer, and a moisture-tight cover layer of nickel applied to the buffer layer by vapor deposition.

9. A foil strain gauge pick-up comprising, substrate means, foil strain gauge means including electrical terminal means operatively secured to said substrate and multiple layer covering means enclosing said foil strain gauge pick-up, said covering means comprising an inner electrically insulating buffer layer, an intermediate electrically conducting layer comprising epoxy resin with metal powder embedded in said epoxy resin, and a moisture-tight outer cover layer comprising a metal such as nickel.

10. A foil strain gauge pick-up comprising, substrate means, foil strain gauge means including electrical terminal means operatively secured to said substrate on one side thereof and multiple layer covering means enclosing said foil strain gauge pick-up, said covering means comprising an inner electrically insulating buffer layer and a moisture-tight outer cover layer, said substrate comprising a bore hole therein beneath said foil strain gauge means, an electrically insulating feed-through means forming a moisture sealing barrier in said bore hole, and first and second leads in said feed-through means in moisture sealing relation, one end of each of said leads being electrically coupled to the electrical terminal means of said foil strain gauge means, the other end of said leads extending through said electrically insulating feed-through means, whereby the electrical coupling to the foil strain gauge means forms a barrier to moisture, thereby effectively sealing the foil strain gauge means.

11. The method of claim 1, wherein the step of applying a waterproof hermetically sealing multiple layer covering to the foil strain gauge pick-up comprises coating the electrically insulated epoxy resin buffer layer and depositing the vapor barrier moisture-proof cover layer so that the multiple layer covering forms a smooth relatively small sloping angle at the interface of the foil strain gauge means and substrate closely bonding to said foil strain gauge means and said substrate, thereby forming a surface free of abrupt transitions, pores, and shadow forming geometries.

12. The method of claim 11, wherein said step of depositing a moisture-proof cover layer comprises vapor depositing said layer.

13. The method of claim 12, wherein said vapor depositing step comprises applying a metal layer by vapor deposition.

14. The method of claim 12, wherein said step of vapor depositing comprises applying an oxide layer by vapor deposition.

15. The method of claim 13, wherein said metal layer comprises nickel.

* * * * *